United States Patent [19]

Schlesch et al.

[11] Patent Number: 4,508,135

[45] Date of Patent: Apr. 2, 1985

[54] COMBINED INLET AND OUTLET FITTING

[75] Inventors: Ronald D. Schlesch, Three Rivers; Robert F. Lyons, Nottawa Township, Saint Joseph County, both of Mich.

[73] Assignee: Armstrong International, Inc., Kalamazoo, Mich.

[21] Appl. No.: 423,495

[22] Filed: Sep. 24, 1982

Related U.S. Application Data

[63] Continuation-in-part of Ser. No. 217,491, Dec. 17, 1980, abandoned.

[51] Int. Cl.³ .............................................. F16T 1/30
[52] U.S. Cl. ..................................... 137/185; 137/270; 285/133 R; 285/415
[58] Field of Search .............................. 137/185, 270; 285/133 R, 190, 415

[56] References Cited

U.S. PATENT DOCUMENTS

| 1,556,745 | 10/1925 | Banta | 285/415 X |
|---|---|---|---|
| 2,293,585 | 8/1942 | Bard | 285/97.3 |
| 2,911,998 | 11/1959 | Drabik et al. | 137/599.1 X |
| 3,113,792 | 12/1963 | Brown | 285/415 X |
| 3,145,035 | 8/1964 | Hanback | 285/190 X |
| 3,219,366 | 11/1965 | Franck | 285/190 |
| 3,524,662 | 8/1970 | Tolman et al. | 285/415 X |
| 3,669,148 | 6/1972 | Burkhalter, Jr. et al. | 285/191 X |
| 3,861,724 | 1/1975 | Spinner | 285/415 |
| 3,966,234 | 6/1976 | Sundholm | 285/415 X |

FOREIGN PATENT DOCUMENTS

| 168230 | 1/1905 | Fed. Rep. of Germany . |
| 27491 | of 1911 | United Kingdom . |
| 651499 | 4/1951 | United Kingdom . |
| 2000568 | 1/1979 | United Kingdom . |
| 2004053 | 3/1979 | United Kingdom . |

Primary Examiner—Martin P. Schwadron
Assistant Examiner—Stephen M. Hepperle
Attorney, Agent, or Firm—Flynn, Thiel, Boutell & Tanis

[57] ABSTRACT

A combined inlet and outlet fitting for a fluid handling mechanism comprising a block having an inlet passage and an outlet passage having corresponding one ends adapted to be connected to the mechanism and the opposite ends thereof extending to the same one longitudinal end of the block. A coupling is attached to said one end of the block so that it can be moved arcuately relative to the block. The coupling has inlet and outlet ports connected to said inlet and outlet passages, respectively. Fastening means are provided for releasably securing said coupling in fluid-tight sealed relationship with said block.

26 Claims, 7 Drawing Figures

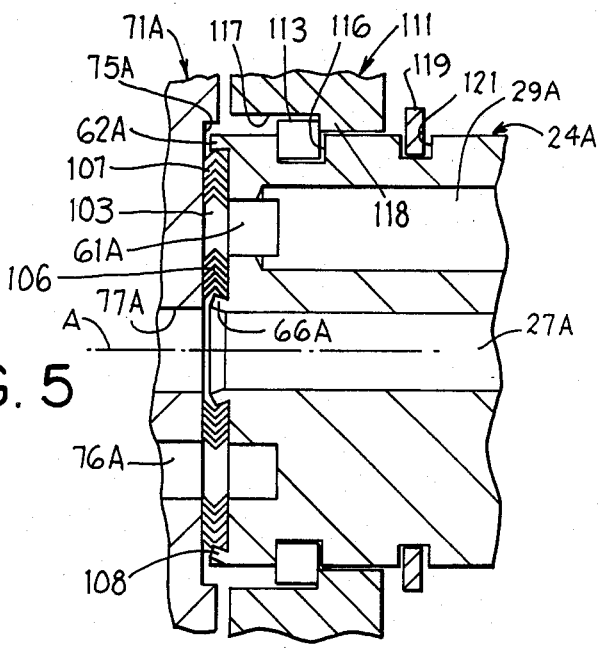
FIG. 5
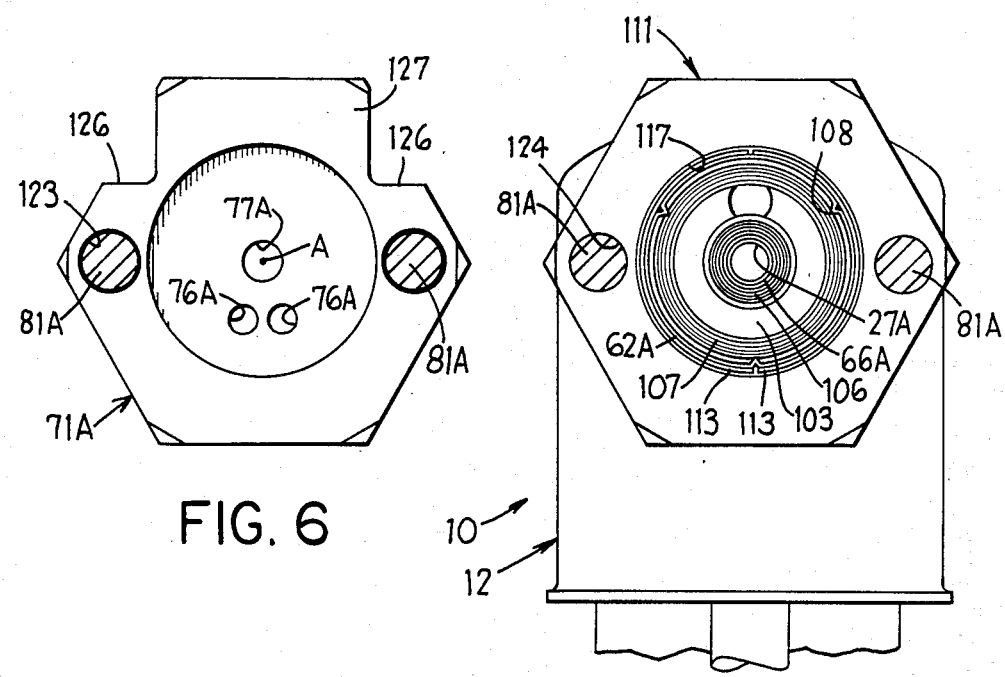
FIG. 6
FIG. 7

COMBINED INLET AND OUTLET FITTING

This application is a continuation-in-part of U.S. patent application Ser. No. 217,491, filed Dec. 17, 1980, now abandoned.

This invention relates to a combined inlet and outlet fitting for fluids, particularly for use in combination with an inverted bucket-type steam trap having a side inlet and a side outlet adjacent to the upper end thereof.

It is well known to use steam traps in order to trap or retain steam in a device or system, while permitting condensate to be removed. One specific type of steam trap is the so-called inverted bucket-type steam trap which has been extensively used for controlling the flow of condensate from a steam-heated unit to a condensate return line. Such traps are generally utilized to permit disposal of the condensate while at the same time minimizing loss of live steam from the steam-heated unit. An inverted bucket steam trap must be installed in a vertical upright position in order to operate in the intended fashion. However, depending on the requirements of a particular installation, the inlet conduit for supplying steam and condensate to the trap and the outlet conduit for removing the condensate from the trap can be disposed at various angles relative to the steam trap and, therefore, it is sometimes necessary to provide special conduit arrangements in order properly to connect the trap to the remainder of the installation. Moreover, it is conventional to provide separate inlets and outlets to steam traps, which means that the installation and removal of the traps require considerable work.

U.S. Pat. No. 4,149,557 discloses an example of an inverted bucket-type steam trap in which the inlet and the outlet are disposed at the upper end of the casing and extend sidewardly therefrom in opposite lateral directions. Although inverted bucket-type steam traps having side inlets and side outlets extending in opposite lateral directions are satisfactory for most purposes, there are certain types of installations for which it is desired to connect the inlet conduit and the outlet conduit to the trap on the same lateral side of the trap.

Further, in U.S. Pat. No. 4,149,557, the inverted bucket-type steam trap comprises a sealed casing made of two cup-shaped sheet metal parts which are welded together to form a cylindrical casing having dome-shaped ends and the inverted bucket mechanism is disposed within that casing. That type of inverted bucket-type steam trap is relatively inexpensive in comparison with inverted bucket-type steam traps in which the casings are made of castings or forgings. It is an economic advantage of the inverted bucket-type steam trap of the type shown in U.S. Pat. No. 4,149,557 that it can be thrown away when it ceases to function properly. However, because that steam trap has its inlet and outlet extending in opposite lateral directions, it is necessary to disconnect that trap at two locations, which is expensive and time consuming and detracts from the overall economy of using that type of trap.

Insofar as is known, it has not previously been suggested to provide a rotatably adjustable single fitting which provides both an inlet and an outlet for an inverted bucket steam trap, despite the fact that such steam traps have been known and used for over seventy years.

Accordingly, it is an object of this invention to provide a combined inlet and outlet fitting for a fluid handling mechanism, particularly a fitting for use in combination with a steam trap having a side inlet and a side outlet.

Another object of this invention is to provide a combined inlet and outlet fitting, as aforesaid, in which the mechanism to which the fitting is connected can be removed in a single operation and a new mechanism installed in its place easily, rapidly and inexpensively.

Another object of this invention is to provide a combined inlet and outlet fitting, as aforesaid, in which the inlet and outlet ports of the fitting can be moved arcuately, relative to the mechanism to which they are connected, so that the inlet conduit and the outlet conduit, to which the inlet port and outlet port are respectively connected, can be disposed at any angle relative to said mechanism.

Another object of this invention is to provide an improved inverted bucket-type steam trap which is provided with a combined inlet and outlet fitting, as aforesaid.

BRIEF DESCRIPTION OF THE DRAWINGS

Other objects and purposes of this invention will become apparent to persons acquainted with equipment of this general type on reading the following description and inspecting the accompanying drawings, in which:

FIG. 5 is an enlarged view of a fragment of FIG. 3.

FIG. 6 is a sectional view substantially taken on the line VI—VI of FIG. 3.

FIG. 7 is a fragmentary sectional view substantially as taken on the line VII—VII of FIG. 3.

SUMMARY

In general, the objects and purposes of the invention are met by providing a combined inlet and outlet fitting for fluids, particularly for use in combination with an inverted bucket steam trap, which fitting comprises an elongated block having an inlet passage and an outlet passage extending lengthwise through the block. The inlet passage and the outlet passage are adapted to be connected at corresponding one ends thereof to a mechanism, such as the inverted bucket steam trap, in order to supply fluid to and to remove fluid from the mechanism. The other ends of the inlet and outlet passages are located at the same one end of the block. A coupling is attached to said one end of the block. The coupling has an inlet port adapted to be connected to a fluid supply conduit and an outlet port adapted to be connected to a fluid discharge conduit. The coupling is rotatably engaged with said one end of the block so that the coupling can be moved arcuately about an axis extending lengthwise of the block whereby the inlet and outlet ports can be located at any selectable adjustable arcuate position relative to the elongated block and then the coupling can be fixed in that position and sealed to said block. The inlet and outlet ports of the coupling are in fluid flow communication with the inlet and outlet passages in the elongated block in all of the selectable adjustable arcuate positions of the coupling relative to the block. Fastening means are provided for releasably securing the coupling in sealed relationship with the block.

DESCRIPTION OF A PREFERRED EMBODIMENT

Figure 1:
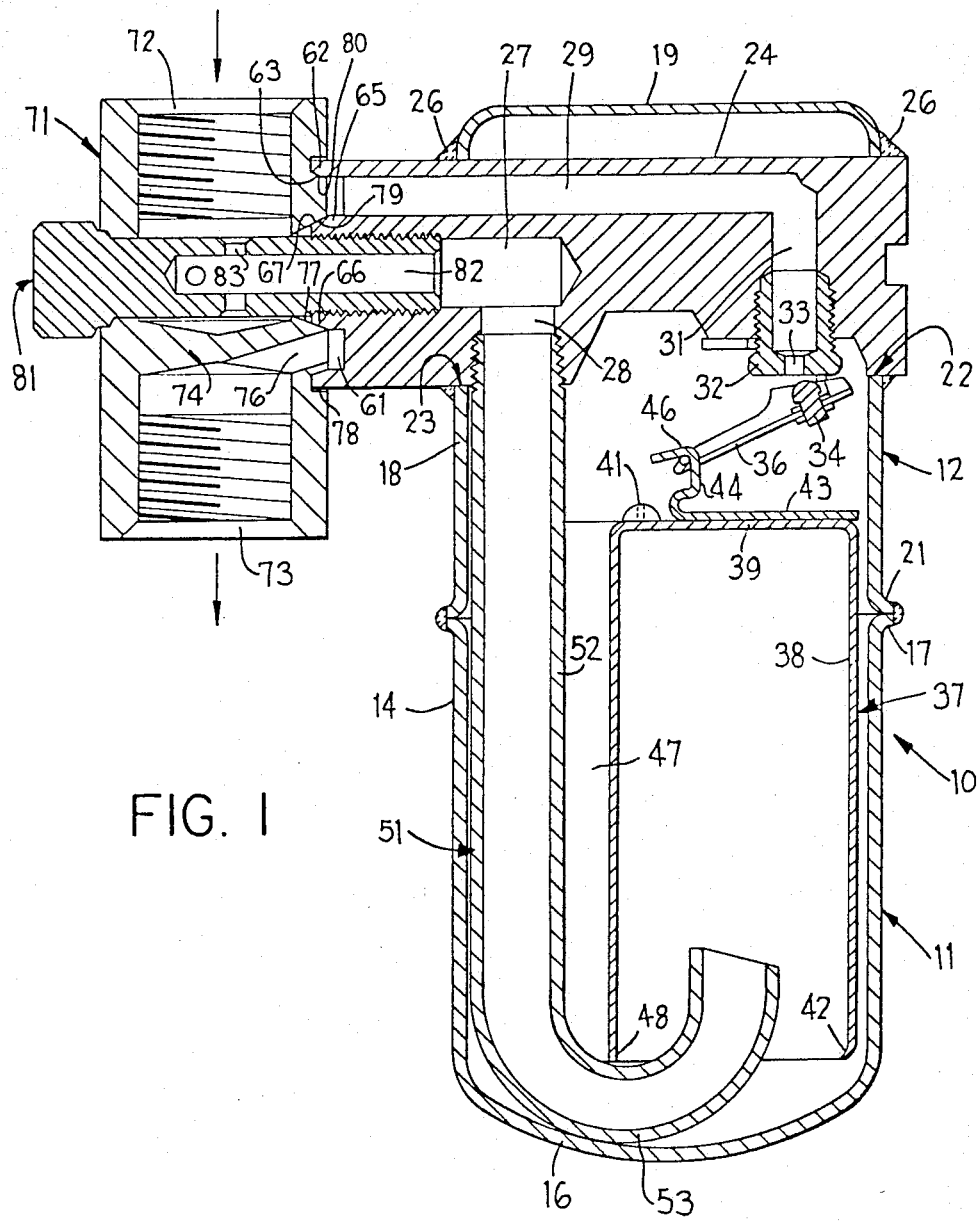
FIG. 1 is a central sectional view of the combined inlet and outlet fitting to which the invention relates, shown installed in combination with an inverted bucket-type steam trap as disclosed in U.S. Pat. No. 4,149,557.

The steam trap 10, per se, illustrated in FIG. 1 is the same as the steam trap disclosed in U.S. Pat. No. 4,149,557 and, accordingly, only brief details of its construction and operation will be given herein. Additional details and explanation concerning the steam trap 10 will be found in the above-referenced United States Patent, to which attention is directed. Moreover, although FIG. 1 illustrates the steam trap of U.S. Pat. No. 4,149,557, in its broader aspects, the combined inlet and outlet fitting according to the invention can be employed with a wide variety of different fluid handling mechanisms and it is not limited to use with the steam trap illustrated in the drawings.

The steam trap 10 illustrated in the drawings has an exterior casing comprised of a lower casing section 11 and an upper casing section 12, both made of sheet stock of substantially uniform wall thickness. The lower casing section 11 has a cylindrical side wall 14 which is open at upper end and which is closed at its lower end by a bottom wall 16. The upper edge portion of the wall 14 is flared radially outwardly to define a radial flange 17. The upper casing section 12 has a cylindrical side wall 18 which is open at its bottom and which is closed at its top by a top wall 19. The lower edge portion of the side wall 18 is flared radially outwardly to define a flange 21 having a peripheral diameter generally equal to the peripheral diameter of the radially extending flange 17 on the lower casing section 11. The flanges 17 and 21 are secured together, as by a weld, thereby to form a sealed and tamper-proof steam trap.

A pair of diametrically aligned circular openings 22 and 23 are provided in the cylindrical wall 18 adjacent the upper end thereof. An elongated block 24 extends through the openings 22 and 23 and is affixed to the wall 18, such as by welds 26. The block 24 has an inlet passage 27 extending into the casing from the leftward end of the block. The inlet passage 27 is generally L-shaped and it has a downwardly extending connecting portion 28. The block 24 also has an outlet passage 29 extending into the casing from the leftward end of the block generally parallel with and disposed above the inlet passage 27. The outlet passage 29 also is substantially L-shaped and it has a downwardly extending portion 31. A hollow externally threaded plug 32 is threadedly received into the threaded recess at the lower end of portion 31. The plug 32 has a passageway 33 through the central portion thereof communicating between the interior of the upper casing section 12 and the passage 29. The lower edge of the passageway 33 defines a valve seat.

A valve member 34 is secured to an operating lever assembly 36. The operating lever assembly 36 is pivotally mounted, in a conventional manner, so that said assembly is capable of pivoting about a horizontal axis. Pivotal movement of the lever assembly 36 about the horizontal pivot axis will move the valve member 34 into and out of sealing relationship with the valve seat defined by the lower edge of the passageway 33 in the plug 32.

An inverted bucket 37 is disposed inside the casing. Preferably the bucket is shaped by drawing a sheet of substantially uniform thickness so as to form a vertical wall 38, which is open at its bottom and closed at its top by a top wall 39. In this particular embodiment, the top wall 39 is flat. A small opening 41 is provided in the top wall 39 offset from the center thereof to permit escape of gas from the upper end of the bucket at a slow controlled rate in a known manner. The bottom edge of the inverted bucket is flared radially inwardly to define a lip 42.

A connector 43 is secured, as by welding, to the upper surface of the top wall 39. The connector 43 has an upwardly extending extension portion 44 close to the common central axis of both the upper and lower casing sections, 12 and 11, respectively, and is bent to define a hook 46 at the upper end thereof. The hook 46 extends through a slot in the lever assembly 36.

The vertical wall 38 is formed to provide a concavo-convex portion, whose outer concave side defines a recess 47 which is preferably substantially U-shaped in cross section. The recess extends continuously from the top to the bottom of the inverted bucket 37, for purposes to be described below. The lower edge 48 of the wall 38 in the recess 47 is straight.

The inverted bucket 37 has sufficient weight to pull the operating lever assembly 36 downwardly and, consequently, pull the valve member 34 away from the valve seat when an insufficient amount of steam has been collected inside the inverted bucket and it is required that condensate be removed from the trap 10. However, when a sufficient quantity of steam collects in the upper end of the bucket 37 to impart buoyancy thereto, the bucket will rise and will close the valve member 34 against the seat.

A substantially J-shaped inlet tube 51 is disposed entirely within the casing 10. The upper end of the inlet tube 51 is threadedly secured in the opening of the connecting portion 28 of the inlet passage 27. The lower end of the inlet tube 51 extends upwardly into the lower end of the inverted bucket 37. The upright leg 52 of the inlet tube 51 is partially received in the recess 47 and extends lengthwise therein. The reversely curved portion 53 of the inlet tube 51 extends under the lower edge 48 of the recess 47 so that the inverted bucket 37 is supported thereon in the lowermost position of the bucket.

As thus far described, except for the elongated block 24, the steam trap 10 is the same as the trap disclosed in U.S. Pat. No. 4,149,557. It can be replaced by other steam traps or other fluid handling mechanisms capable of using the combined inlet and outlet fitting to which the invention relates.

The elongated block 24 extends leftwardly beyond the leftward side of the steam trap casing. The inlet passage 27 and the outlet passage 29 both extend to the leftward end of the elongated block 24. The leftward end of the block 24 is shaped to define an annular recess 61, the upper portion of which communicates with the leftward end of the outlet passage 29. The annular recess 61 encircles the inlet passage 27, but is blocked from direct fluid flow communication therewith by the wall portion 65 that defines the inlet passage 27. The block 24 has a radially outer, annular, leftwardly projecting lip 62 disposed radially outwardly of and projecting axially leftwardly beyond the annular recess 61. The outer lip 62 is coaxial with the central axis of the inlet passage 27. The radially inner surface 63 of the outer annular lip 62 flares in a leftward direction.

The leftward end of the inlet passage 27 in the block 24 is internally threaded for purposes to be described hereinbelow. The wall portion 65 of the block 24 that defines the inlet opening 27 has a radially inner, annular, axially leftwardly projecting lip 66, which is coaxial with the outer lip 62 and is disposed radially inwardly from the recess 61 and projects axially leftwardly beyond said recess 61. The radially outer surface 67 of the inner annular lip 66 tapers in a leftward direction. The leftward ends of the lips 62 and 66 lie substantially within a common vertical plane as appearing in the drawings.

A coupling 71 is attached to the leftward end of the block 24 and extends transversely thereto so that the combination of the block 24 and the coupling 71 define a substantially T-shaped combined inlet and outlet fitting wherein the block 24 defines the stem of the T and the coupling 71 defines the crossbar of the T. The coupling 71 has an inlet port 72 and an outlet port 73 which are coaxial with each other and perpendicular to the inlet passage 27. The inlet and outlet ports 72 and 73 are illustrated as having internal threads for screwed connections with the inlet and outlet conduits (not shown), respectively, but it will be evident that the ports 72 and 73 can be non-threaded so as to be suitable for solvent weld connection with inlet and outlet conduits, such as CPVC pipes, if desired, without departing from the scope of the invention.

A transverse wall 74 extends across the interior of the coupling 71 to block direct connection between the inlet and outlet ports 72 and 73 from each other. One or more openings 76 extend laterally from the axially inner end of the outlet port 73 through the rightward side of the coupling 71 for communication with the annular recess 61 so that fluid flows from the passage 29, through the recess 61 and thence outwardly through the outlet port 73.

The rightward side of the coupling 71 has a circular through opening 77 which is coaxial with the inlet passage 27 in the block 24 and which is adapted to receive the inner annular lip 66. The rightward side of the coupling 71 also has a shallow circular recess 75, the perimeter of which is defined by a deeper annular groove 78 for receiving the outer annular lip 62. The surface 79 of the opening 77 tapers in a leftward direction for engaging the tapered surface 67 of the inner annular lip 66 so that a fluid-tight seal can be established therebetween. The radially inner surface 80 of the groove 78 flares in a leftward direction for engaging the flared surface 63 of the outer annular lip 62 so that a fluid-tight seal can be established therebetween. The groove 78 has a substantially flat bottom wall 85.

The tapered surface 67 and the flared surface 63 on the block 24 extend at substantially equal, but opposite angles, relative to the axis of the inlet passage 27, for example, an angle of $12° \pm \frac{1}{2}°$. The tapered surface 79 and the flared surface 80 on the coupling 71 also extend at substantially equal, but opposite, angles relative to the axis of the inlet passage, which latter angle is larger than the angle of the surfaces 67 and 63, for example, an angle of $20° \pm \frac{1}{2}°$. The dimensions of the mating tapered surfaces 67 and 79, relative to the dimensions of the mating flared surfaces 63 and 80, are selected so that, when the coupling is assembled to the block 24, the surfaces 67 and 79 will abut against and sealingly engage each other slightly before surfaces 63 and 80 abut against and sealingly engage each other. The lip 66 can be deformed radially inwardly during such assembly until surfaces 63 and 80 sealingly engage each other. Moreover, if necessary to secure a fluid-tight assembly, the axial end 84 of lip 62 can be drawn into abutting sealing engagement with the bottom wall 85 of the groove 78.

The coupling 71 is releasably, sealingly affixed to the leftward end of the block 24 by means of a bolt 81. The bolt 81 extends transversely through the inlet port 72 adjacent to the inner end thereof and thence extends through the opening 77 into the inlet passage 27. The inner end of the bolt 81 is externally threaded for threaded engagement with the internal threads in the inlet passage 27. The bolt has an axially extending opening 82 which is open at its rightward end for communication with the inlet passage 27. The leftward end of the opening 82 is closed. A plurality of openings 83 are provided in the bolt and extend radially outwardly from the opening 82 for communication with the inlet port 72 so that incoming fluid can flow from the inlet port 72, through the openings 83 and 82 into the inlet passage 27.

ASSEMBLY AND OPERATION

The assembly of the coupling 71 to the block 24 is effected by placing the coupling 71 in the proper angular orientation with respect to the block 24 and tightening the bolt 81 in order to place the outer lip 62 in the groove 78 and to place the inner lip 66 inside the opening 77. Adjustment of the angular position of the coupling 71 relative to the block 24 can be effected before the bolt 81 is fully tightened. Because the lips 62,66, groove 78 and opening 77 are circular and coaxial, the coupling 71 is rotatable relative to the block 24 and can be disposed at any angle relative to the block 24 to meet the requirements of a particular installation. Following adjustment of the angular position of coupling 71, the bolt 81 is fully tightened to obtain a fluid-tight sealing engagement. During tightening of the bolt 81, first the tapered surfaces 67 and 79 are brought into abutting sealed relationship. Further tightening of the bolt 81 brings the flared surfaces 63 and 80 into abutting sealed relationship or, if the surfaces 63 and 80 do not tightly sealingly abut against each other, the axial end 84 of lip 62 is brought into abutting sealed relationship against the bottom wall 85 of the recess 78. During this further tightening of the bolt, the lip 66 can be deformed radially inwardly as necessary to accommodate such further tightening. However, when the axial end 84 of lip 62 abuts against the bottom wall 85 of the groove 78, such engagement provides a positive stop and prevents further deformation of the lip 66. Thereby, leakage between inlet passage 27 and outlet passage 29 and between coupling 71 and block 24 is eliminated. The coupling 71 and the block 24 can be easily disassembled by reversing the above-described steps. It is to be noted that assembly and disassembly can be done very easily because such involves only manipulation of the bolt 81. The steam trap 10 including block 24 can be easily replaced as a unit.

Although the operation of inverted bucket-type steam traps is well known, an abbreviated discussion thereof will be described below for convenience.

The steam trap 10 is normally installed in a vertical position in a drain line between the steam-heated unit connected to the inlet port 72 and the condensate return header connected to the outlet port 73. When the inverted bucket 37 is in the lowermost position, as shown, the operating lever assembly 36 is in the lower position and the valve member 34 is wide open. The initial flood of condensate enters the steam trap 10 through inlet port 72 and flows through openings 83,82, passage 27 and pipe 52 and then flows beneath the lip 42 of the inverted bucket 37 to fill the trap casing and completely submerge the inverted bucket. Excess condensate is discharged through the wide open valve member 34 to the outlet passage 29, recess 61 and passageway 76 to the discharge port 73. When steam enters the steam trap 10, it collects at the top portion of the inverted bucket 37 imparting buoyancy thereto. The inverted bucket will then rise and lift the valve member 34 toward its seat at the lower end of the passageway 33. When the valve member is close to the seat, but is still spaced therefrom a small distance, the further flow of condensate through the outlet opening 33 will effect a snapping of the valve member 34 into the closed position.

When the valve member 34 is closed, any air and non-condensible gas entering the trap will pass through the vent 41 in the top wall 39 of the inverted bucket 37 and collect at the top of the steam trap in the upper body part 12. Similarly, steam which reaches the upper end of the bucket will flow through the vent 41 at a slow controlled rate. This steam is eventually condensed by radiation from the steam trap. As additional condensate flows into the trap, when the condensate level in the steam trap reaches a level which is slightly above the floating level for the inverted bucket 37, the inverted bucket will exert a slight pull downwardly on the operating lever assembly 36. However, the valve member 34 will not be moved to the open position until the condensate level rises to a predefined opening line in the unit for the existing pressure differential between the steam and the pressure in the outlet passage 29 or condensate return header. When the condensate reaches this level, the weight of the inverted bucket multiplied by the leverage achieved by the length of the operating lever arm assembly 36 exceeds the pressure holding the valve 34 into its sealing engagement with the valve seat. The inverted bucket 37 will then sink and open the valve member 34.

MODIFICATION

The foregoing description of the embodiment of FIGS. 1 and 2 will substantially apply also to the modified embodiment of FIGS. 3–7, except that differences in the modified embodiment are discussed below. In the following description, parts of the embodiment of FIGS. 3–7 generally corresponding to parts of the embodiment of FIGS. 1 and 2 will carry the same reference numerals with the suffix "A" added, and parts identical or substantially identical to parts of the embodiment of FIGS. 1 and 2 will carry the same reference numerals. To avoid unnecessary redundance, the following description is primarily directed to features of the FIGS. 3–7 embodiment by which it differs from the above-described FIGS. 1 and 2 embodiment.

The outlet passage 29A has a recessed rightward end closed by a closure disk 101 fixed, as by welding, to the block 24A. The disk 101 is thus spaced to the left of the downwardly extending portion 31 of the outlet passage 29A.

Figure 3:
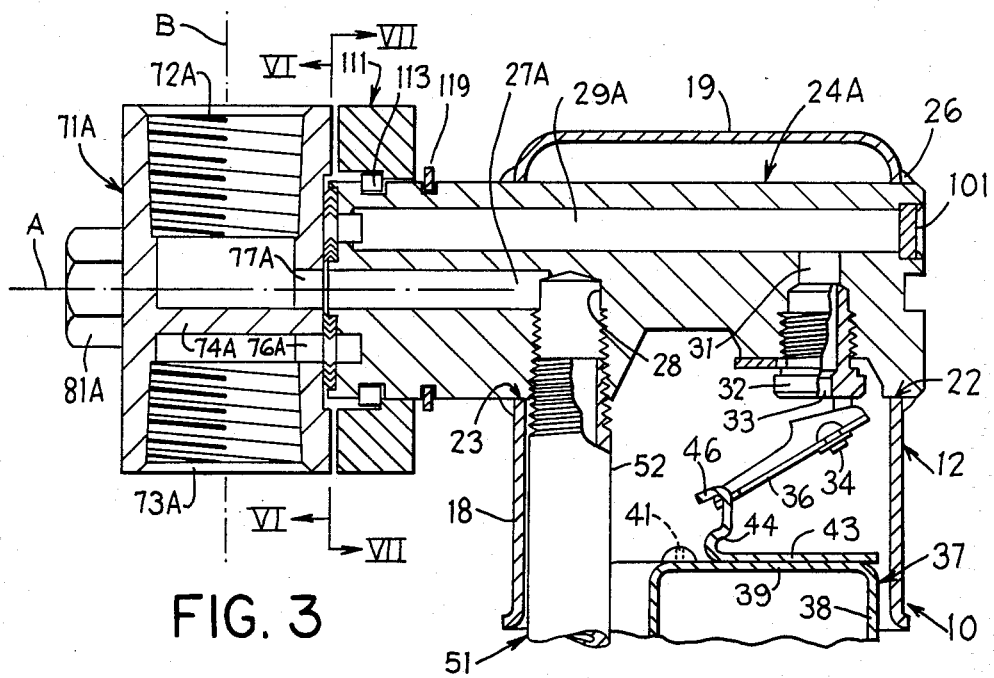
FIG. 3 is a view similar to FIG. 1 but showing a modified combined inlet and outlet fitting and showing only a fragment of the steam trap.

Turning to FIGS. 3 and 5, the outlet passage 29A is preferably formed by drilling from the rightward end of the block 24A to a point near the leftward end of the block. In this way, the annular recess 61A at the left end of the block 24A can be of cross-sectional width less than the diameter of the outlet passage 29A to allow space for annular seals hereafter discussed. The radially narrow recess 61A opens leftwardly to a coaxial annular secondary recess 103 in the left end of the block 24A. The secondary recess 103 is shallower axially but wider radially than the annular recess 61A. The extension of the secondary recess 103 radially outward from and radially inward from the recess 61A provides the space required for the annular seals hereafter discussed. The block 24A has a radially slim, radially outer, annular, leftwardly projecting lip 62A radially outwardly bounding the secondary recess 103. The outer lip 62A is coaxial with the central axis of the inlet passage 27A.

The leftward end of the inlet passage 27A is radially separated from the secondary annular recess 103 by a radially slim, radially inner, annular, axially leftwardly projecting lip 66A, which is coaxial with the outer lip 62A and with the recesses 61A and 103. The leftward ends of lips 62A and 66A lie substantially within a common radial plane (vertical as appearing in the drawings).

The inlet passage 27A preferably is simply a hole drilled coaxially in the left end of the block 24A and terminating in communication with the downwardly extending connection portion 28 of the inlet passage.

In the coupling 71A (FIG. 3), the transverse wall 74A is of relatively thin, radial disklike form and separates the inner ends of the inlet and outlet ports 72A and 73A from each other by a minimum distance, so that the openings 76A (of which two are provided as seen in FIG. 6) extend from the closed end of outlet opening 73A parallel to the axis A on which the coupling 71A is rotatably adjustable on the block 24A, and hence parallel to the circular through-opening 77A. The circular through-opening 77A extends rightward from the closed end of the inlet port 72A and is coaxial with the axis A.

The shallow circular recess 75A in the rightward side of the coupling 71A is centered on the axis A of coupling rotation and is of constant depth across its entire diameter. The diameter of recess 75A in the coupling 71A exceeds the outside diameter of the leftward end of the block 24A so as to radially loosely receive the latter. Thus, when assembled as seen in FIG. 3, the closed end of recess 75A lies in a radial plane close to the ends of the lips 62A and 66A of block 24A, and also parallel to and spaced from the radial plane in which the closed end of the annular secondary recess 103 lies.

In the assembled apparatus, as seen in FIG. 5, compressible inner and outer seals, or gaskets, 106 and 107 lie respectively radially inward of and radially outward of the annular recess 61A of the block 24A, within the annular secondary recess 103. The gaskets 106 and 107 respectively abut the radially inner and outer lips 66A and 61A bounding such recess 103. The gaskets 106 and 107 are axially compressed between the opposed closed ends of coupling recess 75A and block recess 103, by fastening means hereafter described, to provide a sealed, leakfree fluid connection from the opening 77A of inlet port 72A into the inlet passageway 27A and from the outlet passage 29A through the recesses 61A, 103 and 75A into the opening 76A of the outlet port 73A.

It is contemplated that the annular gaskets 106 and 107 may be of various types. However, the ability to form a reliable and long-lasting seal at high temperatures is required when the fitting, including block 24A and coupling 71A, is used in connection with a steam trap as seen in FIG. 3. In that use, the gaskets 106 and 107 are preferably compressible chevron-type units having radially alternating, V-cross-section layers of stainless steel sheet and asbestos. Gaskets of the latter type are commercially available, for example from A. L. Crump Co. located at Chicago, Ill., under the tradename FLEXITALLIC.

As seen in FIGS. 5 and 7, the outer annular gasket 107 is held in place on the left end of the body 24A preferably by staking, here at three substantially evenly circumferentially spaced locations 108. The radially inner annular gasket 106 is preferably held in place by swaging radially outwardly thereagainst of the inner lip 66A.

Figure 4:
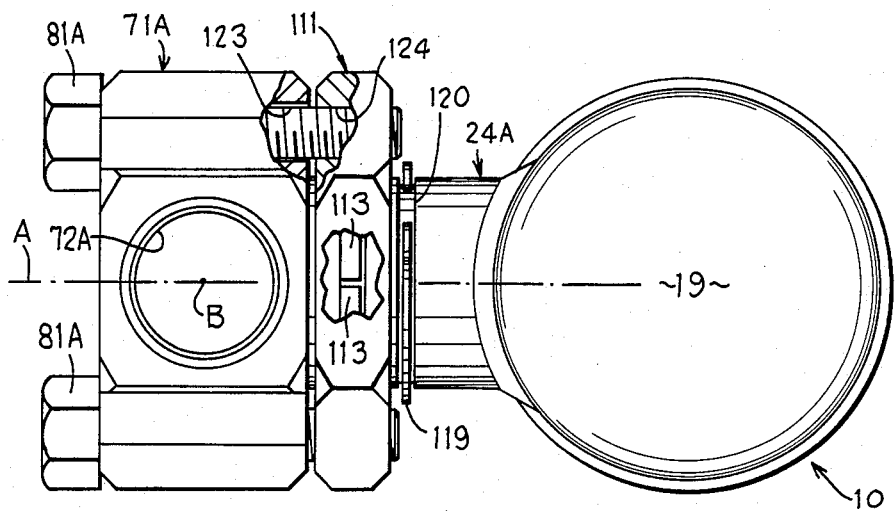
FIG. 4 is a partially broken top view of the apparatus of FIG. 3.

The coupling 71A is releasably, sealingly affixed to the leftward end of the block 24A by fastening means including bolts 81A. More particularly, a removable annular collar 111 is axially slidable on the left end of the block 24A and snugly surrounds the circular cross-section periphery of the block, as seen in FIG. 4. Leftward movement of the annular collar off the end of the body 24A is blocked by a pair of semicircular keys 113, each approaching a half-circle circumferential extend, for convenience referred to as half-circle keys. The half-circle keys 113 diametrally oppose each other and are received in an annular groove 116 in the periphery of the block 24A. The radially outer portion of the keys 113 protrude into a leftward opening counterbore 117 in the collar 111. The collar 111 in its position shown in FIG. 4 loosely but positively retains the half-circle keys 113 radially in the annular groove 116 of body 24A and a conventional snap ring 119 positively prevents sliding of the collar 111 rightwardly beyond the half-circle keys 113 to prevent the collar 111 from releasing the half-circle keys 113 from the groove 116 in the body 24A. The snap ring 119 is axially fixed on the circular periphery of the body 24A in a small annular groove 121 in a conventional manner, the resilience of the snap ring retaining it in the groove 121 unless intentionally removed. The snap ring 119 is a conventional, elastically flexible C-shaped snap ring of greater than 180° circumferential extent. Thus, as seen in FIG. 3, the collar 111 is normally retained axially, with some clearance, between the half-circle keys 113 seated in groove 116 and the snap ring 119, and while so axially retained, the collar 111 in turn radially retains the two half-circle keys 113 in the annular groove 116.

The diametrally spaced pair of said bolts 81A lie symmetrically on opposite sides of the common axis A of the coupling 71A and block 24A, as seen in FIGS. 4, 6 and 7. The bolts 81A have their heads bearing on the leftward side of the coupling 71A and extend therefrom in snug but axially slidable relation along through-bores 123 to threadedly engage threaded holes 124 extending through the thickness of collar 111.

Figure 2:
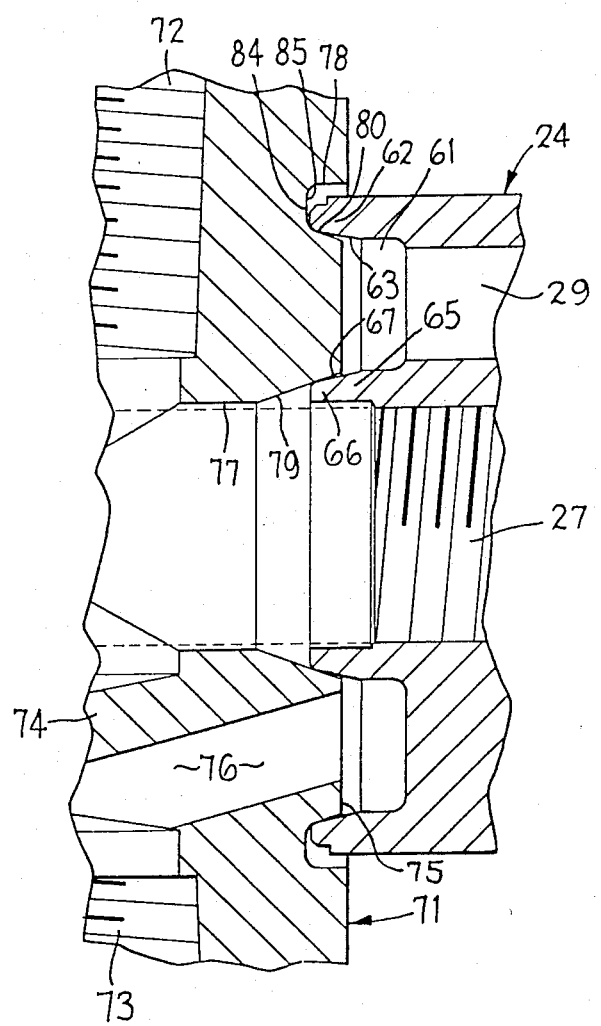
FIG. 2 is an enlarged view of a fragment of FIG. 1, with the connecting bolt removed in order better to illustrate the structure.

Turning now to the assembly and operation of the modified embodiment of FIGS. 3–7, same will be understood to be similar to that above described with respect to the embodiment of FIGS. 1 and 2 except as hereafter noted. Preliminary assembly of the apparatus includes assembly of the casing and contents of the steam trap 10, such that the block 24A is welded in fluid-tight contact in the upper casing portion 12 and protrudes at its leftward end therefrom as seen in FIG. 3, and such that the annular gaskets 106 and 107 are coaxially fixed to the left end of the block 24A in the shallow secondary recess 103 thereof, the gaskets 106 and 107 protruding leftwardly beyond the lips 62A and 66A.

Final assembly is accomplished by installation of the parts 111, 113, 119 and 71A on the left end of the body 24A, as follows. The snap ring 119 is first rightwardly slid onto the leftward end of body 24A, the ends 120 of the snap ring being held apart against the resilience of the snap ring to prevent trapping of the C-shaped snap ring 119 as it passes rightwardly over the grooves 116 and 121, to assume a position spaced to the right of the snap ring groove 121. Then, the collar 111 is slid rightwardly onto the protruding left end of body 24A to a position to the right of the annular groove 116 (beyond its position of FIGS. 3 and 5), so as to surround, or even lie to the right of the snap ring groove 121. The half-circle keys 113 are then moved radially inward toward each other to seat in opposite sides of the annular groove 116. The collar 111 is then slid leftwardly toward its position shown in FIGS. 3 and 5 to receive the two half-circle keys 113 in the leftward facing counterbore 117 of the collar 111, such that the collar surrounds and radially retains the half-circle keys 113 in the groove 116. Further leftward movement of the collar 11 is precluded by engagement of the portion 118 thereof, defining the inner end of recess 117, with the half-circle keys 113. With the collar 111 at its leftward limit shown, and defined by such abutment with the half-circle keys 113, the snap ring 119 can be slid leftwardly along the body 24A until it snaps into the snap ring groove 121. The collar 111 is thus loosely axially trapped between the half-circle keys 113 and snap ring 119 in the manner shown in FIGS. 3–5.

Thereafter, the bolts 81A are slid to the holes 123 in the coupling 71A and threaded into the threaded holes 124 in the collar 111 to thereby join, in coaxial relation, along the axis A, the coupling 71A to the collar 111 and thereby to the left end of the block 24A.

Before tightening of the bolts 81A, the coupling 71A, collar 111 and the bolts 81A joining same are rotatable (that is angularly adjustable) about the axis A and with respect to the block 24A. In this way, with the axis A maintained horizontal, the coupling 71A is rotatable to align its inlet and outlet ports 72A and 73A with the axis of a fluid line (not shown) in which the apparatus is to be inserted, for example by a threaded engagement in the ports 72A and 73A of threaded ends or fittings of adjacent portions of such a fluid line. Thus, the embodiment of FIGS. 3–7 can be connected in a fluid line which is vertical, horizontal, or at any other position of rotation about the axis A while maintaining the steam trap 10 in its upright position shown in FIG. 3. The bolts 81A can then be tightened, for example to a torque of 35 to 50 foot-pounds. This partially compresses the gaskets 106 and 107 between the closed radial ends of the recesses 75A and 103 (FIG. 5). The thus partially compressed gaskets 106 and 107 respectively effect a sealed fluid connection along the inlet path 77A and 27A, as well as along the outlet path 29A, 61A, 103 and 76A. Such tightening of the bolts 81A also, by frictional engagement of the gaskets 106 and 107 with the ends of the opposed recesses 75A and 103, prevents further arcuate adjustment between the coupling 71A and body 24A. Also with the bolts 81A so tightened, the collar 111 and lips 62A and 66A of the block 24A remain spaced by a small gap from the axially opposed surfaces of the coupling 71A, such that all of the axial force set up by tightening of bolts 81A is applied to, and assists sealing by, the annular gaskets 106 and 107.

Simply by loosening the bolts 81A, the body 24A and steam trap 10 are once again angularly adjustable with respect to the axis B (FIG. 3) of the coupling inlet and outlet ports 72A and 73A. By removing the bolts 81A from the collar 111, the unit comprising the steam trap 10, body 24A with gaskets 106 and 107, snap ring 119, half-circle keys 113 and collar 111 may be removed from the coupling 71A for purposes of repair or replacement and another such unit can immediately be substituted by engaging same with and tightening of the bolts 81A.

To facilitate rotative adjustment of the coupling 71A and collar 111, the periphery of at least one is here shaped to facilitate firm gripping thereof by a wrench, and in the embodiment shown in FIGS. 6 and 7, both are of substantially hexagonal peripheral shape. Since a wrench large enough to grip across the opposed parallel flats of such a hexagonal shape may not always be available, the coupling 71A may also have an adjacent, but noncontiguous, pair of its flats notched as indicated at 126 in FIG. 6 to leave a substantially rectangular lug 127 which can be gripped by a substantially smaller wrench jaw to rotate the coupling 71, and therewith collar 111 with respect to the block 24A and steam trap 10.

Whereas the embodiment of FIGS. 1 and 2 is well suited to operation at high temperatures, since it requires no separate gaskets of resilient or compressible material, the modified embodiment of FIGS. 3-7 can also be made to operate at high temperatures by selection of suitable high temperature gaskets, for example of the kind above described. The modified embodiment of FIGS. 3-7 is less critical as to tolerances between sealing surfaces on the body and coupling, and hence is to an extent easier to manufacture, due to elimination of direct metal-to-metal sealing contact between the body and coupling. In the modified embodiment, the use of two bolts 81A both free of fluid passages, to secure the coupling 71A to the block 24A provides sufficient force to sufficiently compress relatively stiff high temperature gaskets as to give adequate sealing.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A combined inlet and outlet fitting for a fluid handling mechanism, comprising:

an elongated block having an inlet passage and an outlet passage extending lengthwise through said block, said inlet passage and said outlet passage having corresponding one ends adapted to be connected to the fluid handling mechanism in order to supply fluid to and to remove fluid from the mechanism, respectively, the opposite ends of said inlet passage and said outlet passage extending through the same one longitudinal end of said block; a coupling having one side attached to said one end of said block, said coupling having an inlet port adapted to be connected to a fluid supply conduit and a substantially oppositely directed outlet port adapted to be connected to a fluid discharge conduit, said coupling being interengaged at its said one side with said one end of said block so that said coupling can be moved arcuately about an axis extending lengthwise of said block so that said inlet and outlet ports can be located at selectable angular positions relative to said elongated block while remaining in fluid flow communication with said inlet and outlet passages, respectively; and fastening means for releasably securing said coupling in fluid-tight sealed relationship with said block, wherein the improvement comprises a fixed imperforate wall extending transversely across the coupling to commonly close the inner ends of said ports, said one end of said block being of circular cross section with a peripheral wall coaxial with said axis, said block being generally cylindrical from end to end to facilitate its lengthwise insertion into said mechanism, said coupling having a circular but shallow recess means in its said one side of diameter larger than said ports and into which slightly projects said one end of said block, lateral through openings of diameter less than said ports extending closely along the opposite side of said transverse wall from the inner ends of the respective inlet and outlet ports through said one side of said coupling, one said passage and said lateral through opening at the inner end of one said port together forming a straight through continuous elongate hole containing said axis of arcuate movement therein, said one end of said block having an annular groove therein loosely surrounding said hole and communicating with the other said passage in said block and with said lateral through opening at the inner end of the other said port, said recess means in said coupling and the circular cross section end of said block projecting thereinto having opposed fluid sealing faces, said fastening means extending in a direction away from said block through said coupling and having a portion accessible from the end of said coupling remote from the block for releasing said coupling from said block.

2. A fitting as claimed in claim 1, in which said fastening means is a bolt which extends transversely through said coupling and longitudinally into said block, said bolt being threaded into said inlet passage of said block and having a coaxial passageway which communicates at its outer end with said inlet port of said coupling and which communicates at its inner end with said inlet passage of said block.

3. A fitting as claimed in claim 1, in which said one end of said block has an annular lip projecting into said recess means in said one side of said coupling and slidably and sealably engaged therewith so that said coupling can be moved arcuately relative to said block about the central axis of said recess means to change the arcuate disposition of said inlet port and said outlet port relative to said block.

4. A fitting as claimed in claim 2, in which said one end of said block has a first annular lip projecting toward said opening containing said axis and slidably and sealably engaged therewith and a second annular lip projecting into said recess means in said one side of said coupling and slidably and sealably engaged therewith so that said coupling can be moved arcuately relative to said block about said axis to change the arcuate disposition of said inlet port and said outlet port relative to said block.

5. A fitting as claimed in claim 3, in which the radially outer part of said recess means in said side of said coupling is deepened to form a groove, which groove and said annular lip have similarly inclined walls capable of sealingly engaging each other.

6. A fitting as claimed in claim 4, in which said first and said second annular lips have similarly flaring walls and have transversely extending flat faces with at least the latter capable of sealingly engaging said one side of said coupling.

7. A steam trap, comprising:
a casing defining a water-tight chamber having a cylindrical side wall and closed top and bottom walls;
an elongated block mounted on said cylindrical side wall adjacent the upper end thereof, said block having an inlet passage and an outlet passage extending lengthwise through said block, said inlet passage and said outlet passage having inner end portions opening into said chamber, the opposite ends of said inlet passage and said outlet passage extending to the same one longitudinal end of said block;
gravity responsive valve means in said chamber for opening and closing said outlet passage;
an inlet means disposed within said chamber and operatively connecting said inlet passage to said valve means for controlling the latter in response to steam and condensate received from said inlet passage;
a coupling attached to said one end of said block, said coupling having an inlet port adapted to be connected to a fluid supply conduit and an outlet port adapted to be connected to a fluid discharge conduit, said coupling being interengaged with said one end of said block so that said coupling can be moved arcuately about an axis extending lengthwise of said block so that said inlet and outlet ports can be located at selectable angular positions relative to said elongated block while remaining in fluid flow communication with said inlet and outlet passages, respectively; and
fastening means for releasably securing said coupling in fluid-tight sealed relationship with said block.

8. A fluid handling mechanism, comprising:
a casing defining a water-tight chamber having a cylindrical side wall and closed top and bottom walls, said casing having at least one opening in said cylindrical side wall adjacent the upper end thereof;
an elongated block of cross-sectional shape corresponding to that of said opening, said block being inserted lengthwise snugly through said opening to extend lengthwise substantially diametrically across said chamber, said block having a middle portion at said opening and fixed sealingly to said casing adjacent the edge of said opening, one longitudinal end of the block extending outward from the casing, the other end of said block being adjacent the cylindrical side wall on the side of the casing remote from said opening, said block abutting against said casing adjacent its said other end and remote from said opening, the block having an inlet passage and an outlet passage extending lengthwise through said block, said inlet passage and said outlet passage having inner end portions opening downwardly into said chamber, the opposite ends of said inlet passage and said outlet passage opening through said one longitudinal end of said block;
fluid handling means disposed in said chamber and operatively connected with said inner end portions of said inlet and outlet passages;
a coupling attached to said one end of said block beside the casing, said coupling having an inlet port adapted to be connected to a fluid supply conduit and an outlet port adapted to be connected to a fluid discharge conduit, said coupling being interengaged with said one end of said block so that said coupling can be moved arcuately about an axis extending lengthwise of said block so that said inlet and outlet ports can be located at selectable angular positions relative to said elongated block while remaining in fluid flow communication with said inlet and outlet passages, respectively; and
fastening means for releasably securing said coupling in fluid-tight sealed relationship with said block.

9. An inverted bucket steam trap, comprising:
a casing defining a water-tight chamber having a cylindrical side wall and closed top and bottom walls;
an elongated block mounted on said cylindrical side wall adjacent the upper end thereof, said block having an inlet passage and an outlet passage extending lengthwise through said block, said inlet passage and said outlet passage having inner end portions opening downwardly into said chamber, said end portion of said outlet passage having a valve seat thereon inside said chamber, the opposite ends of said inlet passage and said outlet passage extending to the same one longitudinal end of said block;
a valve member movably disposed in said chamber and adapted to be moved into and out of sealing engagement with said valve seat;
operating lever means disposed in said chamber and responsive to vertically applied force to effect movement of said valve member toward and away from said valve seat;
a vertically movable inverted bucket disposed in said chamber and having a vertical side wall which is open at its bottom and has a wall at its top and a connection from the top wall of the bucket to said operating lever means whereby vertical movement of said inverted bucket in said chamber will effect movement of said operating lever means thereby to open or close said valve member;
an inlet tube disposed within said chamber and connected at its upper end to said lower end of said inlet passage for receiving steam and condensate therefrom, the lower end of said inlet tube extending upwardly into said inverted bucket;
a coupling attached to said one end of said block, said coupling having an inlet port adapted to be connected to a fluid supply conduit and an outlet port adapted to be connected to a fluid discharge conduit, said coupling being connected with said one end of said block at any desired angular position about an axis extending lengthwise of said block; and
fastening means for securing said coupling in fluid-tight sealed relationship with said block with said inlet and outlet ports located at the desired angular position relative to said elongated block and in fluid flow communication with said inlet and outlet passages, respectively.

10. An inverted bucket steam trap, comprising:

a casing defining a water-tight chamber having a cylindrical side wall and closed top and bottom walls;

an elongated block mounted on said cylindrical side wall adjacent the upper end thereof, said block having an inlet passage and an outlet passage extending lengthwise through said block, said inlet passage and said outlet passage having inner end portions opening downwardly into said chamber, said end portion of said outlet passage having a valve seat thereon inside said chamber, the opposite ends of said inlet passage and said outlet passage extending to the same one longitudinal end of said block;

a valve member movably disposed in said chamber and adapted to be moved into and out of sealing engagement with said valve seat;

operating lever means disposed in said chamber and responsive to vertically applied force to effect movement of said valve member toward and away from said valve seat;

a vertically movable inverted bucket disposed in said chamber and having a vertical side wall which is open at its bottom and has a wall at its top and a connection from the top wall of the bucket to said operating lever means whereby vertical movement of said inverted bucket in said chamber will effect movement of said operating lever means thereby to open or close said valve member;

an inlet tube disposed within said chamber and connected at its upper end to said lower end of said inlet passage for receiving steam and condensate therefrom, the lower end of said inlet tube extending upwardly into said inverted bucket;

a coupling attached to said one end of said block, said coupling having an inlet port adapted to be connected to a fluid supply conduit and an outlet port adapted to be connected to a fluid discharge conduit, said coupling being interengaged with said one end of said block so that said coupling can be moved arcuately about an axis extending lengthwise of said block so that said inlet and outlet ports can be located at selectable angular positions relative to said elongated block while remaining in fluid flow communication with said inlet and outlet passages, respectively; and fastening means for releasably securing said coupling in fluid-tight sealed relationship with said block.

11. An inverted bucket stream trap as claimed in claim 10 in which said block and said coupling define a T-shaped assembly wherein said block defines the stem of the T and said coupling defines the crossbar of the T.

12. An inverted bucket steam trap as claimed in claim 11 in which said fastening means is a bolt which extends transversely through said coupling and longitudinally into said block, said bolt being threaded into said inlet passage of said block and having a coaxial passageway which communicates at its outer end with said inlet port of said coupling and which communicates at its inner end with said inlet passage of said block.

13. An inverted bucket steam trap as claimed in claim 10, in which said coupling has an exterior wall disposed adjacent to said one end of said block, one of said exterior wall and said one end of said block having an annular groove therein and the other thereof having an annular lip projecting into said groove and slidably and sealably engaged therewith so that said coupling can be moved arcuately relative to said block about the central axis of said groove to change the arcuate disposition of said inlet port and said outlet port relative to said block.

14. An inverted bucket steam trap as claimed in claim 12 in which said coupling has an exterior wall disposed adjacent to said one end of said block, said exterior wall having a central opening coaxial with said inlet passage and through which said bolt extends, said exterior wall having an annular groove therein coaxial with and radially outwardly spaced from said central opening, said one end of said block having a first annular lip projecting into said central opening and slidably and sealably engaged therewith and a second annular lip projecting into said groove and slidably and sealably engaged therewith so that said coupling can be moved arcuately relative to said block about the central axis of said groove and said opening to change the arcuate disposition of said inlet port and said outlet port relative to said block.

15. An inverted bucket steam trap as claimed in claim 13 in which said outlet passage is parallel with said inlet passage and communicates with an annular recess in said block which recess is disposed radially inside of said groove and communicates with said outlet port in said coupling.

16. An inverted bucket steam trap as claimed in claim 14 in which said outlet passage is parallel with said inlet passage and communicates with an annular recess in said block which recess is disposed radially inside of said groove and radially outwardly of said central opening and communicates with said outlet port in said coupling.

17. A fitting as claimed in claim 13 in which said groove and said annular lip have similarly inclined walls capable of sealingly engaging each other.

18. A fitting as claimed in claim 14 in which said groove and said second annular lip have similarly flaring walls capable of sealingly engaging each other and have transversely extending flat faces capable of sealingly engaging each other, and said central opening and said first annular lip have similarly tapering walls capable of sealingly engaging each other.

19. A steam trap as claimed in claim 7, in which said fastening means comprises a collar rotatable on said block but secured against axial movement off said one end of said block, fastening members engageable with said coupling and collar to permit same to rotate together on said block and tightenable to urge said coupling into fixed sealed relation with said one end of said block.

20. A steam trap according to claim 19, including gasket means interposed axially between said one end of said block and said coupling and located to radially isolate said inlet passage from said outlet passage, to isolate said inlet port from said outlet port, and to permit fluid flow from said inlet port to said inlet passage and to permit fluid flow from said outlet passage to said outlet port.

21. A steam trap according to claim 20, in which said gasket means comprises coaxial inner and outer annular gaskets of axially compressible type, said block having an annular recess at said one end thereof surrounding and isolated from said inlet passage by an axially extending annular lip, said annular recess communicating with said outlet passage radially between said inner and outer annular gaskets and also communicating axially with said outlet port radially between said inner and outer annular gaskets, said body having an axially extending lip at the periphery thereof bounding the outer periphery of said annular recess, said inlet passage of said body being coaxial with said annular recess and with said inlet port, said fastening means compressing said inner and outer gaskets axially to an extent to prevent leakage therepast either out of the apparatus or between the inlet and outlet passages upon tightening of said fastening members, while still leaving an axial space between said coupling and body and between at least portions of said coupling and collar.

22. A steam trap according to claim 19, in which said collar has an inner counterbore opening toward said coupling, said block has an annular groove in the periphery thereof adjacent said one end thereof, and including removable key means held against axial movement within said groove and protruding radially therefrom into said counterbore so as to be surrounded by and radially trapped by said collar, said collar having a radially inward extending portion backing said counterbore and radially overlapping said key means to positively prevent axial movement of said collar off said one end of said body in response to tightening of said threaded members.

23. A steam trap according to claim 22, in which said key means comprises a diametrally opposed pair of half-circle keys.

24. A steam trap according to claim 22, in which said body includes a further peripheral groove spaced from said one end of said body by said first-mentioned groove and a snap ring received in said further groove and protruding radially outward therefrom for loosely axially entrapping the radially inwardly extending portion of said collar between said key means and snap ring, said snap ring being positioned axially to prevent movement of said collar sufficiently axially away from said one end of said block to the extent required to no longer surround and radially entrap said key means.

25. A fluid handling mechanism, comprising:
   a casing containing fluid handling means;
   an elongated block having an inlet passage and an outlet passage extending lengthwise through said block, said inlet passage and outlet passage having corresponding one ends adapted to be connected to the fluid handling means in order to supply fluid to and to remove fluid from the fluid handling means, respectively, the opposite ends of said inlet passage and outlet passage extending through the same one longitudinal end of said block;
   a coupling having one side attached to said one end of said block, said coupling having an inlet port adapted to be connected to a fluid supply conduit and a substantially oppositely directed outlet port adapted to be connected to a fluid discharge conduit, said coupling being interengaged at its said one side with said one end of said block so that said coupling can be moved arcuately about an axis extending lengthwise of said block so that said inlet and outlet ports can be located at selectable angular positions relative to said elongated block while remaining in fluid flow communication with said inlet and outlet passages, respectively; and
   fastening means for releasably securing said coupling in fluid-tight sealed relationship with said block,
   said block protruding as an axially elongate neck of circuit cross-section cantilevered out from said casing, said fastening means including a collar sleeved on said neck in a zone spaced outward from said casing for rotation with respect to said casing and axially opposing said coupling, axial blocking means on said neck and spaced from said casing for limiting axial movement of said collar away from said casing, plural fastening members distributed circumferentially on said coupling and collar and tightenable to urge said coupling toward said collar, that surface of said collar which axially opposes said coupling and through which said fastening means extends being offset axially away from said casing beyond said axial blocking means on said neck, axial stop means removably fixed on said neck between said axial blocking means and casing for preventing unintended axial shifting of said collar out of surrounding relation with said axial blocking means, seal means interposed between said one end of said neck and the opposed side of said coupling and responsive to tightening of said fastening members for sealing connecting said inlet and outlet ports with said inlet and outlet passages respectively, said seal means being offset radially inward with respect to said collar such that said collar is free of contact with said seal means.

26. A fitting according to claim 25 in which said means blocking axial movement of said collar comprises a diametrally opposed pair of half circle keys radially inwardly insertably received in an annular groove in said neck and releasably held therein by surrounding with said collar, said collar having a counterbore facing toward said one end of said neck and in which said half circle keys are axially slidably received, said collar having a portion extending radially inward from said counterbore in axially interfering relation with said half circle keys to positively prevent movement of said collar off said one end of said neck, said axial stop means being spaced from said collar by less than the axial depth of said counterbore for thereby preventing release of said half circle keys from said counterbore, said fastening means comprising diametrally spaced bolts symmetrically disposed on opposite sides of and in parallel with the axis of rotation of said coupling on said neck, said bolts axially securing said coupling to said collar and being tightenable to force said coupling against said end of said neck in a fluid sealed, nonrotatable manner, said bolts being loosenable to permit rotation of said coupling and collar with respect to said neck, said seal means including annular compressible gaskets interposed between said one end of said neck and said coupling to effect fluid-tight connection of said inlet and outlet ports with said inlet and outlet passages respectively.

* * * * *